(No Model.)
G. R. KELLY.
HARROW.
No. 301,242. Patented July 1, 1884.
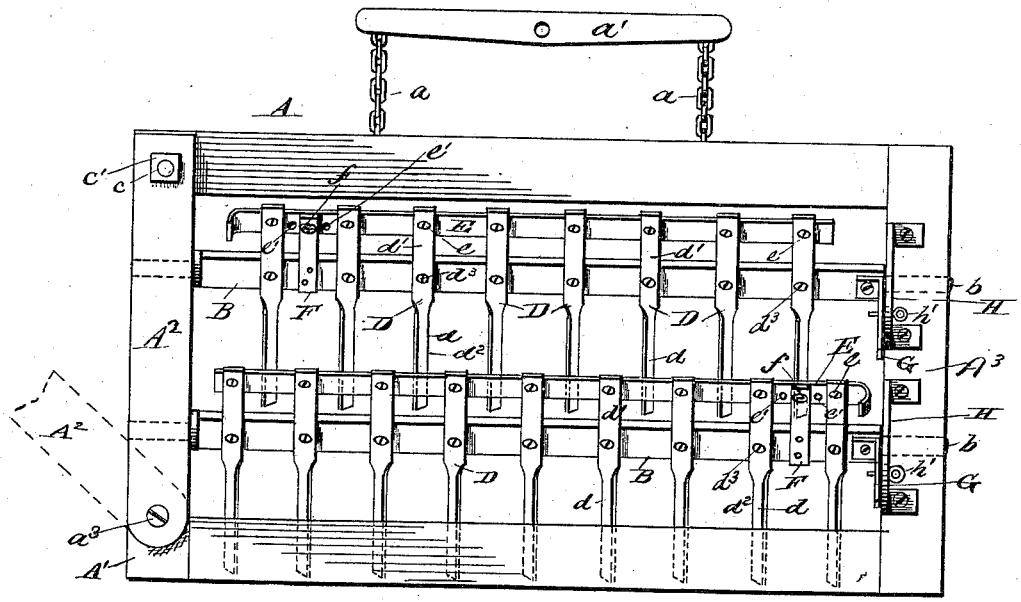
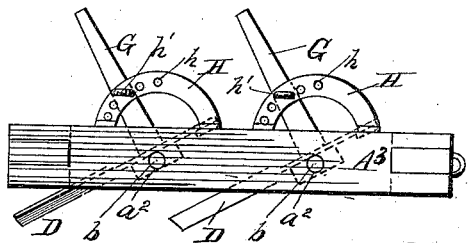
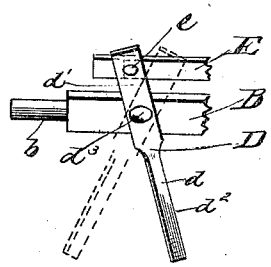
Attest:
W. H. H. Knight
Inventor
George R. Kelly
per Edson Bros.
Attorneys

UNITED STATES PATENT OFFICE.

GEORGE ROBERT KELLY, OF KINGSTON, NEW JERSEY.

HARROW.

SPECIFICATION forming part of Letters Patent No. 301,242, dated July 1, 1884.

Application filed January 26, 1884. (No model.)

*To all whom it may concern:*

Be it known that I, GEORGE R. KELLY, a citizen of the United States, residing at Kingston, in the county of Middlesex and State of New Jersey, have invented certain new and useful Improvements in Harrows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to harrows for the use of farmers, gardeners, nursery-men, &c., and has for its object the provision of an implement wherein the teeth are adapted to be raised and lowered and set at different angles with the line of draft.

Heretofore considerable difficulty, annoyance, and loss of time have been experienced by those whose business or occupation has necessitated the use of implements of the class named, owing to the fact that, as a rule, such implements have been provided with straight unyielding teeth, and therefore liable to become choked or clogged by clods of earth, stones, &c. This is especially true when the land has become hardened and soggy by rainfalls, or been used for grass-growing for several years.

To obviate the above-named objections, and at the same time provide a harrow that will cut its way through vegetable matter at or near the surface of the land, has been the object of this invention; and to this end it consists in the construction, arrangement, and combination of parts substantially as hereinafter described, and specifically pointed out in the claim.

In the drawings, Figure 1 is a top plan view of a harrow embodying my invention. Fig. 2 is an edge view thereof, which illustrates the manner in which the teeth are raised and lowered. Fig. 3 is a portion of the bar to which the teeth are pivoted; also, the shifting-bar and a tooth pivoted thereto, and shown at different angles by dotted and full lines with relation to the line of draft of the harrow. Figs. 4 and 5 are detail views of a tooth detached from the harrow.

Similar letters of reference in the several drawings denote like parts.

Referring to said drawings, A represents the frame of the harrow, preferably of wood, and provided with draft-chains $a$ and bar $a'$ at its forward side, as shown.

B B represent bars of metal, either rectangular or triangular in cross-section, each being provided at its ends with journals $b$, that have bearings $a^2$ in the side timbers of the frame A. The bearings in the side timber, A', of frame A open to the upper surface thereof, and are covered by a flat plate, $A^2$, of metal, which is pivoted at $a^3$ to the under surface of the timbers A', and is held in proper position by a bolt, $c$, and nut $c'$. When it is desired to remove the bars B from the frame, the plate $A^2$ is released from the bolt $c$ and swung outwardly, as shown in dotted lines in Fig. 1, when the bars may be removed.

D represents the teeth, preferably made of steel-plate, and in the form shown in Figs. 4 and 5—that is to say, having its lower cutting portion, $d$, at an angle of about forty-five degrees with its upper portion, $d'$, said lower portion being provided with a knife-edged or sharpened lower edge, $d^2$. The teeth D are pivoted to the bars B B by screws or bolts $d^3$, and are also at their forward ends pivoted by screws $e$ to a bar, E. By the above-described construction it will be seen that the longitudinal movement of the bar E will cause the lower ends of the teeth D to swing from side to side; also, that the lower ends of said teeth will be caused to move up or down by rocking of the bars B B in their journal-bearings.

I maintain the teeth at any desired position by the following means, to wit: F represents short plates, one of which is riveted at one end to each of the bars B B, between and at a point equidistant from two (preferably the end) teeth. The plates F extend forward, and each is provided near its free end with an aperture, through which a bolt, $f$, passes into apertures $e'$, formed in the bar E, thus holding said bar locked against longitudinal movement. $e'$ $e'$ represent apertures formed at different points in said bar for the purpose of holding the teeth at different angles, as will be readily understood.

I maintain the teeth D in different angles of elevation by substantially the following-described means, to wit: G G represent levers projecting upwardly from one end of each of the bars B B. H represents curved plates attached to and projecting upwardly from the upper surface of the timber $A^3$, and have bearings against the face of the levers G. $h$ represents apertures formed in the curved plates H, through which a pin, $h'$, passes, and thence into one of the apertures in the lever G. By moving the lever backward and forward and confining it at one or the other of the points $h$, different angles of elevation may be given to the teeth, as will be readily understood.

If desired, the teeth of the harrow may be placed at different lateral angles—that is to say, the teeth pivoted to the front bar, B, may extend rearwardly to the right, and those upon the rear bar may extend to the left, and thus the track of the teeth upon the front bar be cut into by the teeth upon the rear bar, whereby the soil will be thoroughly pulverized, as will be seen. Again, the teeth may have different degrees of inclination with respect to the front and rear bars. The teeth D, having lower cutting-edges, serve to more thoroughly pulverize newly-broken land, inasmuch as the said sharpened teeth cleanly cut without being clogged by the sod and clods.

I do not confine myself to the exact form and proportion of parts herein shown and described, inasmuch as changes in the details of construction may be made without departing from the principle or sacrificing the advantages thereof. I would therefore have it understood that I hold myself at liberty to make such changes as fairly fall within the scope of my invention.

I am aware that it is not broadly new to pivot a series of teeth to a rock-shaft and an adjustable shifting-bar, in combination with means for holding the rock-shaft in any desired position.

What I claim as my invention, and desire to secure by Letters Patent of the United States, is—

In a harrow substantially as described, the combination, with the frame A, having journals for rock-shafts B, secured by pivoted plate $A^2$, of the adjustable shifting-bars E, secured to brackets F, rigid with the rock-bars B, the twisted teeth D, pivoted to the bars B E, and arranged in series, those in one series being inclined reversely to those in the other series, and means for turning the bars B to bring the said teeth nearer to a vertical or horizontal plane at will, as set forth.

In testimony whereof I affix my signature in presence of two witnesses.

GEORGE ROBERT KELLY.

Witnesses:
 JOHN G. TURNER,
 WM. J. GIBBY.